(12) United States Patent
Mayer et al.

(10) Patent No.: US 9,388,835 B2
(45) Date of Patent: Jul. 12, 2016

(54) METHOD FOR CONNECTING PARTS RELATIVE TO ONE ANOTHER

(71) Applicant: Woodwelding AG, Stansstad (CH)

(72) Inventors: Jörg Mayer, Niederlenz (CH); Mario Lehmann, Les Pommerats (CH); Andreas Wenger, Muri b. Bern (CH)

(73) Assignee: WOODWELDING AG, Stansstad (CH)

( * ) Notice: Subject to any disclaimer, the term of this patent is extended or adjusted under 35 U.S.C. 154(b) by 0 days.

(21) Appl. No.: 14/440,926

(22) PCT Filed: Nov. 11, 2013

(86) PCT No.: PCT/CH2013/000196
§ 371 (c)(1),
(2) Date: May 6, 2015

(87) PCT Pub. No.: WO2014/075200
PCT Pub. Date: May 22, 2014

(65) Prior Publication Data
US 2015/0300389 A1    Oct. 22, 2015

Related U.S. Application Data

(60) Provisional application No. 61/725,730, filed on Nov. 13, 2012.

(51) Int. Cl.
*B32B 37/00* (2006.01)
*F16B 3/00* (2006.01)
(Continued)

(52) U.S. Cl.
CPC . *F16B 3/00* (2013.01); *B29C 65/08* (2013.01);
*B29C 65/601* (2013.01); *B29C 65/603* (2013.01); *B29C 65/604* (2013.01);
(Continued)

(58) Field of Classification Search
CPC .......... F16B 3/00; B29C 65/601; B29C 65/08
USPC ................. 156/73.1, 92, 306.6, 309.6, 580.1, 156/580.2
See application file for complete search history.

(56) References Cited

U.S. PATENT DOCUMENTS

| 4,865,680 A | * | 9/1989 | Pierson | ................... B29C 65/08 156/497 |
| 5,310,434 A | * | 5/1994 | Vives | ...................... F16B 4/004 156/293 |

(Continued)

FOREIGN PATENT DOCUMENTS

| EP | 0 392 568 | 10/1990 |
| EP | 1 614 525 | 1/2006 |

(Continued)

*Primary Examiner* — James Sells
(74) *Attorney, Agent, or Firm* — Rankin, Hill & Clark LLP (57) ABSTRACT

A method of connecting parts relative to one another includes the steps of providing a first part, the first part having an opening; providing a second part, the second part having thermoplastic material in a solid state; arranging the first part and the second part relative to one another, so that the second part reaches into the opening, while a volume with an undercut is defined in the opening; causing a mechanical pressure and mechanical energy to act on the second part until at least a part of the thermoplastic material is caused to liquefy and to fill the volume; and causing the thermoplastic material to re-solidify, thereby anchoring the second part in the first part.

18 Claims, 12 Drawing Sheets

(51) Int. Cl.
   *B29C 65/08*   (2006.01)
   *B29C 70/84*   (2006.01)
   *B29C 65/60*   (2006.01)
   *B29C 65/00*   (2006.01)
   B29L 31/00    (2006.01)
   B29L 31/30    (2006.01)
   B29C 43/18    (2006.01)
   B29C 65/02    (2006.01)
   B29C 43/32    (2006.01)

(52) U.S. Cl.
   CPC ........... *B29C66/112* (2013.01); *B29C 66/1122* (2013.01); *B29C 66/131* (2013.01); *B29C 66/474* (2013.01); *B29C 66/7392* (2013.01); *B29C 66/8322* (2013.01); *B29C 70/845* (2013.01); *F16B 3/005* (2013.01); *B29C 43/18* (2013.01); *B29C 65/02* (2013.01); *B29C 66/304* (2013.01); *B29C 66/342* (2013.01); *B29C 66/45* (2013.01); *B29C 66/721* (2013.01); *B29C 66/742* (2013.01); *B29C 66/81423* (2013.01); *B29C 66/81429* (2013.01); *B29C 2043/3266* (2013.01); *B29L 2031/30* (2013.01); *B29L 2031/3076* (2013.01); *B29L 2031/737* (2013.01)

(56) References Cited

U.S. PATENT DOCUMENTS 6,913,666 B1 * 7/2005 Aeschlimann .......... B29C 65/56
                                                    156/303.1
2008/0047107 A1 * 2/2008 Clinch .............. B29C 66/43421
                                                    16/404

FOREIGN PATENT DOCUMENTS

FR    2 483 195    12/1981
GB    2 205 374    12/1988

* cited by examiner

METHOD FOR CONNECTING PARTS RELATIVE TO ONE ANOTHER

BACKGROUND OF THE INVENTION

1. Field of the Invention

The invention is in the fields of mechanical engineering and construction, especially mechanical construction, for example automotive engineering, aircraft construction, shipbuilding, machine construction, toy construction etc.

2. Description of Related Art

In engineering and construction, there is still room of improvement for the fixation of parts relative to one another. For example, in automotive aircraft, shipbuilding and machine construction industries, metallic or ceramic parts manufactured by different techniques have to be connected to one another. For example, in automotive industry spaceframe connections of beams and pressure die cast parts are crucial for the stability of the automobile's frame.

Known connectors are bolts, screws and rivets. These are well established. However, the stress induced in the connected parts by, for example, a screw connection is significant. Also, when the manufactured article (for example an automobile or an aircraft) is in use, vibration induced loosening of the connection may constitute a potential problem. Finally, the assembly time is an issue when manufacturing cost is to be minimized.

Therefore, there is a need for improved methods and devices for fixating parts relative to one another.

SUMMARY OF THE INVENTION

Accordingly, it is an object of the present invention to provide a method for connecting parts relative to one another, which methods overcome drawbacks of prior art methods.

According to an aspect of the invention, a method of connecting parts relative to one another is provided, the method comprising the steps of Providing a first part, the first part comprising an opening;
Providing a second part, the second part comprising thermoplastic material in a solid state;
Arranging the first part and the second part relative to one another, so that the second part reaches into the opening, while a cavity with an undercut and a well-defined cavity volume is defined;
Causing energy to act on the second part until at least a part of the thermoplastic material is caused to liquefy and to fill the cavity; and
Causing the thermoplastic material to re-solidify, thereby anchoring the second part in the first part.

The fact that the cavity has a well-defined volume means, for example, that the cavity walls delimit the volume and cannot be penetrated by the thermoplastic material even when put under hydrostatic pressure. This especially rules out that the cavity walls are of an open-cell (open porous) material or of a material in which such pores are generated by hydrostatic pressure. It does not, however, rule out the possibility that the cavity is delimited by a user-adjustable means, such as a movable piston.

Thus, during the process the cavity is, for example, completely filled by the thermoplastic material. The cavity has thus the function of a casting mold. This allows the use of a defined polymer volume and possibly defined consolidation conditions.

The cavity may be formed be one or a combination of:
The opening being a blind hole with an undercut, for example a broadening constituted by a surrounding portion and/or a plurality of radial features; then the cavity is formed by at least a portion of the hole;
The opening being a through hole that, as viewed from a proximal side, forms an undercut and that at a distal end is closed off by a further element, such as an auxiliary element; such auxiliary element may for the cast process be provisionally fixed to the first element, for example by a conventional connector;
a cavity formed between the first part and a third part to be assembled with the first part, wherein the opening in the first part forms part of the cavity.

The energy—that is initially coupled into the solid, not yet liquefied second part—may be mechanical energy. As an example, the mechanical energy may be mechanical vibration energy, especially ultrasonic vibration energy.

For liquefying then, in addition to the for example mechanical energy, also mechanical pressure may be caused to act on the second part, for example to press the second part against a surface portion of the first part, and for example while energy acts on the second part.

Thus, in an example, the step of:
causing energy to act on the second part until at least a part of the thermoplastic material is caused to liquefy and to fill the cavity
comprises:
causing a mechanical pressure and mechanical energy to act on the second part until at least a part of the thermoplastic material is caused to liquefy and to fill the cavity.

As an alternative, the energy may be radiation energy, for example coupled into the second part, which then is at least partially transparent. The second part and/or the first part and/or an other part of the assembly in contact with the second part then includes a portion that absorbs radiation and transforms the radiation into heat. Especially, in an embodiment, radiation, such as laser radiation, is coupled into the second part and propagates therethrough to an interface with the first element where at the surface of which the radiation is absorbed. By the heat thus generated at the surface of the first element, the second element is melted where in contact with the heated surface; this process is carried out until the cavity is filled by molten material of the second part.

As an even further alternative, the energy may be heat supplied via heat conduction or, for example, by an electrical current generated in the second or first part or an other part of the assembly.

Also combinations are possible.

The second part may be structured to be capable of connecting a further part to the first part. For example, it may include a screw-like head that may clamp a further part to the first part. In addition or as an alternative, it may include a core of a material that does not liquefy under the conditions sufficient for liquefying the thermoplastic material (this core material may be, for example, metallic, ceramic, or of a strongly fiber reinforced composite) and to which such a further part can be connected, for example in a conventional manner by a screw connection or other conventional mechanical connection, or also in accordance with the invention.

The first part may be, for example, metallic or possibly of a ceramic or hard plastic material; other materials are not excluded. Especially, the first part may be a die cast metal part, for example of Aluminum or Magnesium. The opening with the undercut in this may be viewed as a casting mold for the thermoplastic material. In contrast to conventional molding methods, the thermoplastic material is inserted in an initially solid state and is liquefied in situ by the—for example mechanical—energy.

The process constitutes a primary shaping process but—compared to prior art molding processes—with less transfer of material in the liquid state, and thus without the necessity of an extruder, nozzle or the like. This makes it possible to be used also with highly filled thermoplastic materials. As a further advantage over prior art shaping methods, such as injection molding, not only one access (or very few accesses) is/are available, but, since only energy has to be supplied after placement of the second part, access from a large variety of locations or directions is possible.

The opening having the undercut may be viewed to serve as a kind of key hole, with the key being cast into the key hole in situ by the process. Therein, the shape can be such as to lock one degree of freedom (for example against pullout) or more up to all degrees of freedom.

In embodiments, the thermoplastic material after liquefaction is caused to be under hydrostatic pressure, especially also at the interface to the first part and/or other parts that define the volume, respectively. The hydrostatic pressure profile during cooling allows controlling the consolidation conditions of the liquefied part and by this to compensate for thermal shrinkage or to suppress pore formation in the cooling melt.

In contrast to anchoring by liquefiable material in for example porous elements, the cavity in aspects of the invention is defined by the first part and possibly further elements. In other words, a defined mold volume for casting is provided, and this defined volume is filled using liquefaction of a solid second part placed so that it reaches into the opening when being still in the solid state and using energy that liquefies at least portions of the second part. This allows full control on the material flow during the cast process: the volume that will ultimately be filled is fully predictable.

The cavity defines a macroscopic, pre-defined undercut. The undercut may especially be defined by shapes into which the first part and/or possibly other elements are formed/cast in their manufacturing process.

In all embodiments, optionally, the volume of the thermoplastic material (and possible further elements of the second part, such as a hard core) may be adapted to the volume of the cavity so that no surplus material is present and the volume is exactly filled.

In embodiments, the opening includes a shaft portion (or duct portion) and at least one broadening portion distally thereof. The shaft portion may have a constant cross section along an axis, the cross section being almost arbitrarily selected or chosen, for example circular, rectangular, triangular, T-shaped, double-T-shaped, elliptical, etc. The broadening portion has a different cross section, the radial extension into at least one direction being larger than the cross section of the shaft portion to yield the undercut. Especially, the cross sectional area of broadening portion may be larger than the cross sectional area of the shaft portion (especially in cross sections taken perpendicular to the axis, which is the introduction axis).

The second part may have a cross section that corresponds to the cross section of the shaft portion. For example, the second part may include a portion shaped to approximately fit the shaft portion of the opening.

In a group of embodiments, the second part has a core of a material not liquefiable under the conditions that are present during the process (and, for example, especially not at temperatures below 450° C. or 350° C. or below 250° C.) and further has thermoplastic material around the core. In these embodiments, the arrangement of the thermoplastic material and the conditions during casting may be chosen so that after the process there is no direct physical contact between the core and the first part. The thermoplastic material forms a barrier between the core and the first part. This barrier has the possible advantage of having the potential to damp any mechanical shock and/or vibration acting on the first part or on the core with respect to the core or the first part, respectively. Also, the barrier may serve as barrier against corrosion.

In addition to damping, the thermoplastic material also ensures a uniform distribution of the stress if the connection is subject to a mechanical load. Stress calculations have shown that compared to a conventional screw, a the stress on the second material and consequently the strain of the second material may be reduced by using a core covered with the thermoplastic material by up to between 75% and 90%.

A core in these embodiments may have a cross section corresponding in its shape to the shaft portion cross section but smaller.

Instead of one core, the second part may have a plurality of cores.

The energy according to embodiments may be supplied in the form of mechanical vibration, especially ultrasonic vibration.

Such vibration may be coupled into the second part from the proximal side. To this end, the proximal side of the second part may include an incoupling surface, for example a flat surface or a surface otherwise adapted to the shape of a tool (sonotrode) with a distal surface through which the vibrations are coupled into the second part. In some embodiments with second parts with a core, the core may form the incoupling surface, i.e. at the proximal side the core is not covered by the thermoplastic material. In other embodiments, the core may be entirely, on all surfaces, be covered by the thermoplastic material.

Also other forms of energy may be coupled into the second part from the proximal side. Especially, in such embodiments, the cavity may be formed by the opening being a blind opening or being accessible from the proximal side and being closed-off to the distal side by a further element.

Alternatively, vibration may be coupled—indirectly—into the second part via the first part and/or a third part to be assembled with the first part. This is especially suited for embodiments in which the cavity is formed between the first part and a third part.

Mechanical vibration or oscillation suitable for devices and methods according to aspects of the invention has preferably a frequency between 2 and 200 kHz (even more preferably between 10 and 100 kHz, or between 20 and 40 kHz) and a vibration energy of 0.2 to 20 W per square millimeter of active surface. The vibrating element (tool, for example sonotrode) is, for example, designed such that its contact face oscillates predominantly in the direction of the element axis (longitudinal vibration) and with an amplitude of between 1 and 100 μm, preferably around 10 to 30 μm. Rotational or radial oscillation is also possible.

For specific embodiments of devices, it is possible also to use, instead of mechanical vibration, a rotational movement for creating the necessary friction heat needed for the liquefaction of the anchoring material. Such rotational movement has preferably a speed in the range of 10,000 to 100,000 rpm.

The fact that the thermoplastic material is liquefied by mechanical energy, for example vibration, brings about the advantage that the process is potentially very fast. Tests have revealed that under the above-described conditions as little time as about 1 second may be sufficient for the casting process.

In this text the expression "thermoplastic material being capable of being made flowable e.g. by mechanical vibration" or in short "liquefiable thermoplastic material" or "liquefiable material" or "thermoplastic" is used for describing a material having at least one thermoplastic component, which material becomes liquid (flowable) when heated, in particular when heated through friction, i.e., when arranged at one of a pair of surfaces (contact faces) being in contact with each other and vibrationally or rotationally moved relative to each other, wherein the frequency of the vibration is between 2 kHz and 200 kHz, preferably 20 to 40 kHz and the amplitude between 1 µm and 100 µm, preferably around 10 to 30 µm. Such vibrations are, for example, produced by ultrasonic devices as is known, for example, from ultrasonic welding. Often, it is advantageous if the material has an elasticity coefficient of more than 0.5 GPa, especially if no non-liquefiable core is used.

Specific embodiments of materials are: Polyetherketone (PEEK), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers, long fibers or continuous fibers.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Especially, in contrast to prior art molding methods, such as injection molding, the method according to aspects of the invention is particularly suited for the use of highly filled thermoplastics with a filling grade of for example even more than 30%, up to 55% (for materials produced in an extruder) or even up to 60% or up to 65% (thermoplastic material manufactured by pultrusion); generally the filling fraction may be between 0% and 65%; all percentages in this paragraph being volume-% values.

In accordance with an embodiment alternative to the embodiments with a core, the second part may consist of the thermoplastic material, the pure polymer or with a filler.

Especially in embodiments in which the thermoplastic material is a polymer with a filler, for example a fiber reinforced plastics, —but not restricted to these embodiments— the step of causing the thermoplastic material to liquefy may be followed by a consolidating step. To this end, pressure on the second part is maintained after the energy source is switched off and while the thermoplastic material re-solidification sets in. Because of the well-defined volume, the pressure can be maintained all along, and this may be used to prevent deformation due to the intrinsic stiffness of fiber fillers (and/or shrinking processes or the like) after the casting.

BRIEF DESCRIPTION OF THE DRAWINGS

In the following, ways to carry out the invention and embodiments are described referring to drawings. The drawings are schematic. In the drawings, same reference numerals refer to same or analogous elements. The drawings show:

FIGS. 1-10*b* embodiments of connections made by embodiments of methods according to the invention;

FIGS. 11*a*-18*b* shapes of openings;

DESCRIPTION OF THE PREFERRED EMBODIMENTS

Figure 1A:
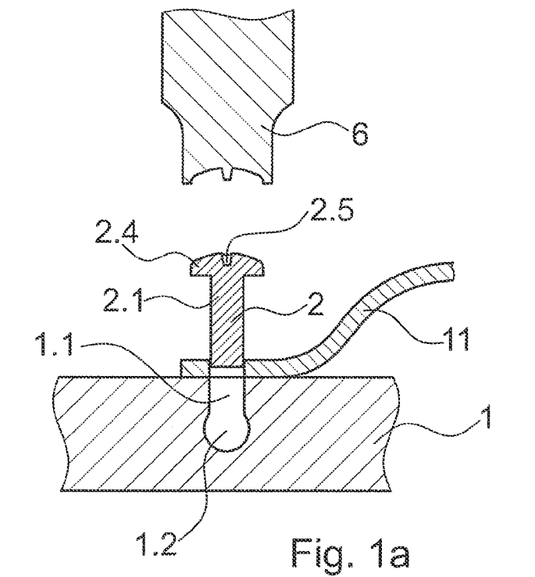

FIG. 1*a* shows a basic configuration with a first part having an opening with a shaft portion 1.1 and a broadening portion 1.2 defining an undercut. A second part 2 in the depicted configuration consists of thermoplastic material. The second part has a shaft portion 2.1 and a proximal head 2.4 with a guiding indentation 2.5. The sonotrode (or horn) 6 has a shape adapted to the shape of the head portion. A further element 11 to be connected to the first part 1 is depicted with a through-going hole.

The initial head portion 2.4 is optional. Alternatively to the second part having such a head portion, such portion may be shaped in the casting process after liquefaction of the thermoplastic material in the vicinity to the sonotrode 6. Also, further alternatives exist.

For the casting process, the sonotrode 6 presses the second part 2 into the opening and couples vibrations into the second part, whereby the distal end face is pressed against the bottom of the opening. Due to energy absorbed by external and internal friction, the thermoplastic material is heated and starts softening, thus becoming flowable, wherafter it starts filling the opening. After the opening is completely filled, the source of the vibrations (ultrasonic apparatus) is shut off while the pressure is maintained until the cast thermoplastic material has solidified at least at the surface due to cooling.

Figure 1B:
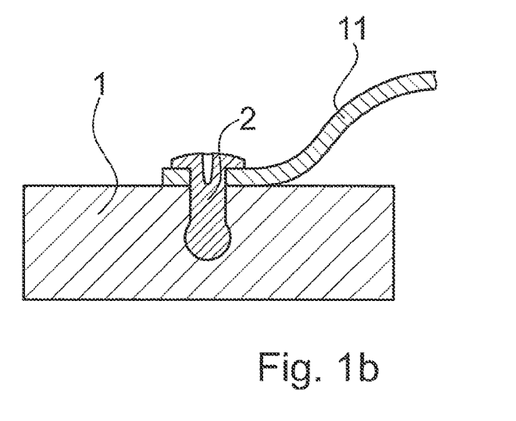
Figure 1C:
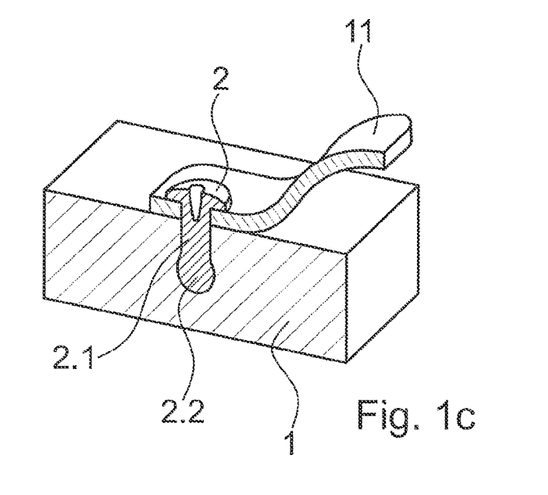

In FIGS. 1*b* and 1*c*, the configuration of FIG. 1*a* (without the sonotrode 6) is shown after the casting process. The thermoplastic material of the second part in the casting process has molten, filled the volume defined by the opening and then re-solidified. The further element 11 is clamped to the first part 1 by the second part 2.

In the description of subsequent embodiments, only differences to the previously described embodiments are referred to.

Figure 2:
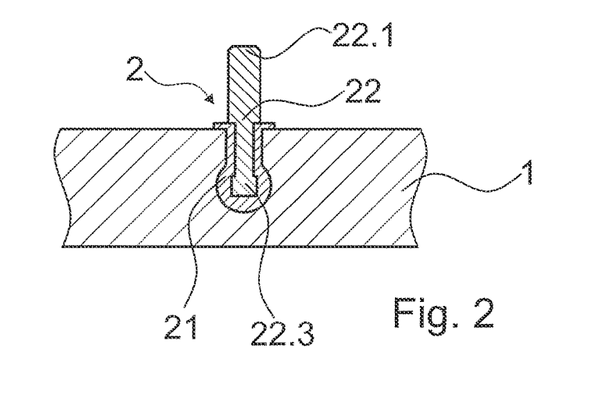

FIG. 2 shows an embodiment with a second part 2 that in addition to the thermoplastic material 21 also comprises a metallic core 22, for example of steel. The proximal portion 22.1 may comprise features such as a thread for connecting a further element to it. The core has a distal broadening 22.3 that has a diameter of less than the diameter of the shaft portion of the opening but broader than a shaft portion of the core 22 to anchor the core not only by adhesion but also by a positive-fit in the re-solidified thermoplastic material.

In this and in all other embodiments, in addition to the shown undercut that causes a positive-fit connection securing against pulling out, the core (if applicable) and/or the opening in the first part may comprise features that deviate from circular symmetry (around an axis that in FIG. 2 is vertical) to additionally secure against rotational movements.

Figure 3A:
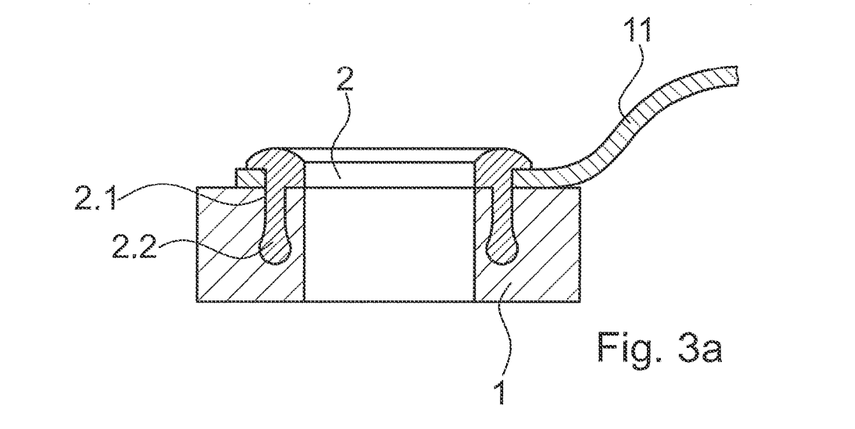
Figure 3B:
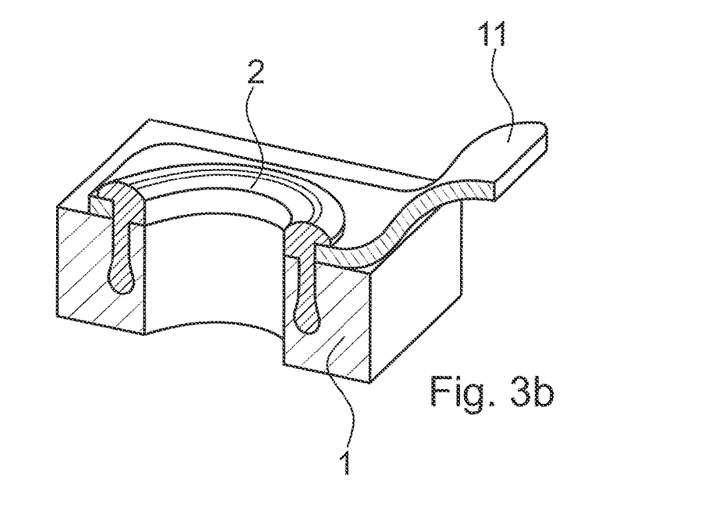

FIGS. 3*a* and 3*b* depict an embodiment in which a further element is secured to the first part by a second part 2 having ring symmetry. This embodiment may be beneficial if the first part has a relatively large hole (or similar feature) and the further element is to be secured to the first part around this hole.

Figures 4A, 4B:
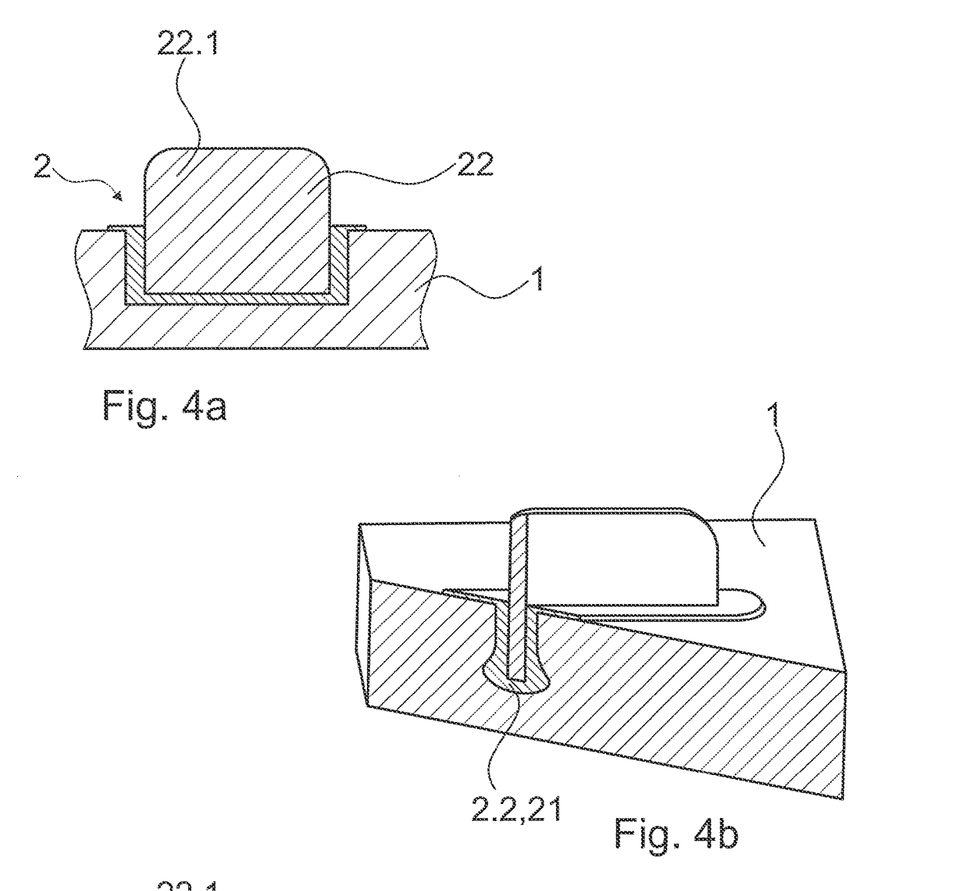
Figure 4C:
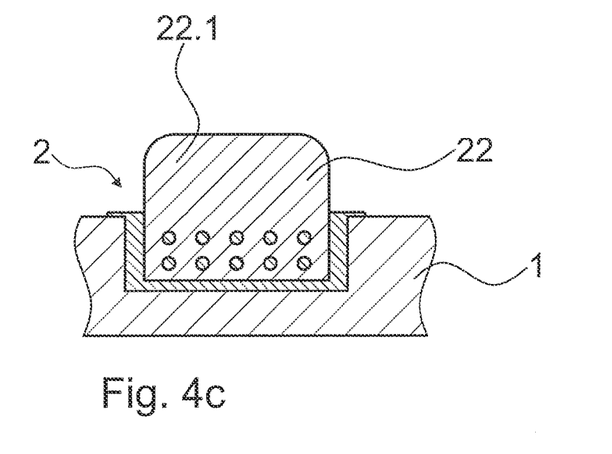

FIGS. 4*a*-4*c* show an embodiment in which the opening is generally slit-shaped with a distal broadening. The second part 2 is correspondingly shaped, for example it has a plate shape. For a sound anchoring in the thermoplastic material 21 after the casting process (and optionally also before), the core 22 may have, as illustrated in FIG. 4*c*, a plurality of holes 22.5 interpenetrated by thermoplastic material 21; other structures defining a positive-fit connection against pulling forces are possible.

Figure 5A:
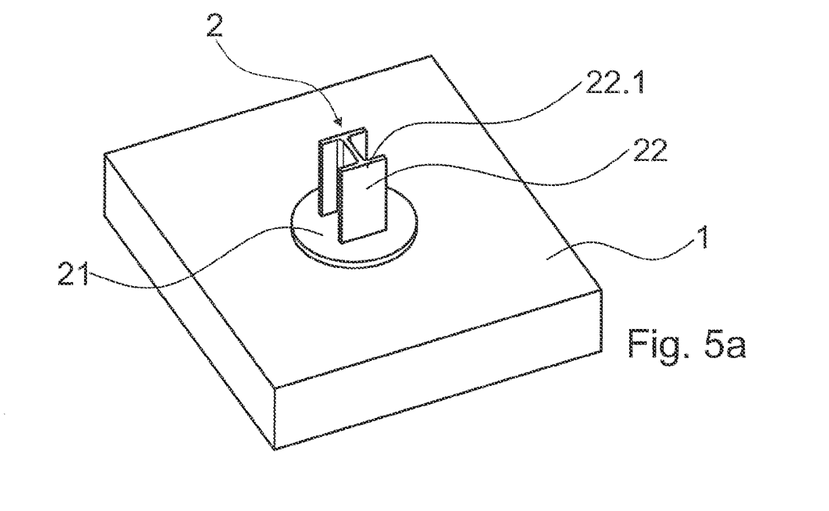
Figure 5B:
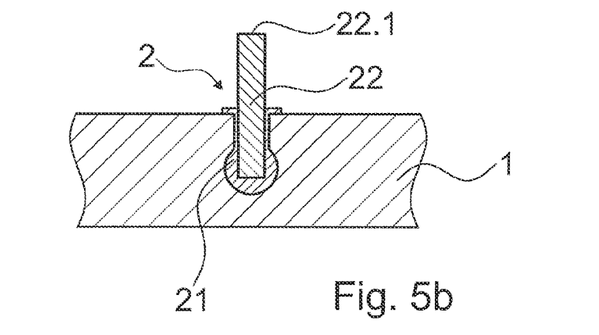
Figure 5C:
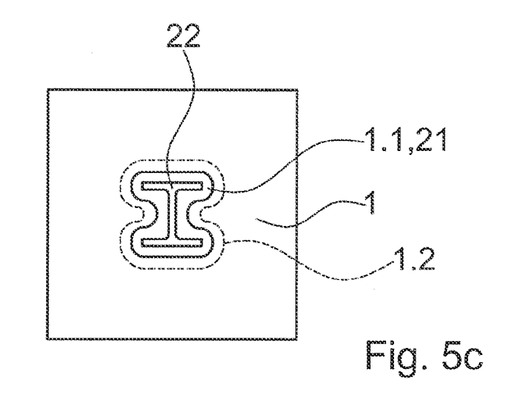
Figure 5D:
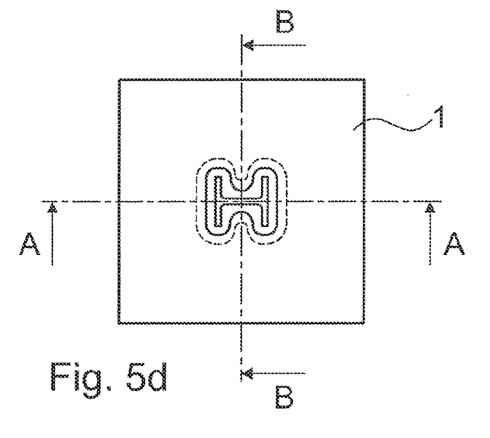
Figure 5E:
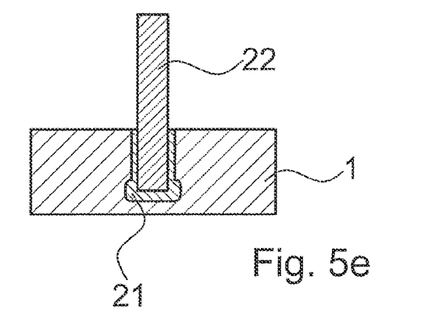
Figure 5F:
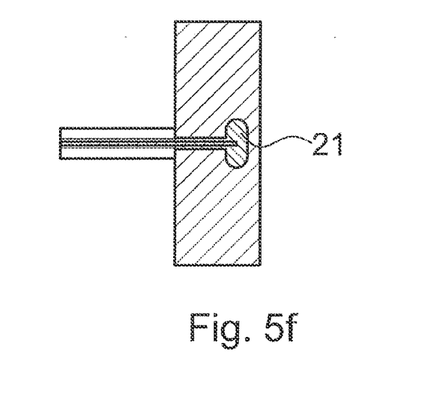
Figure 5G:
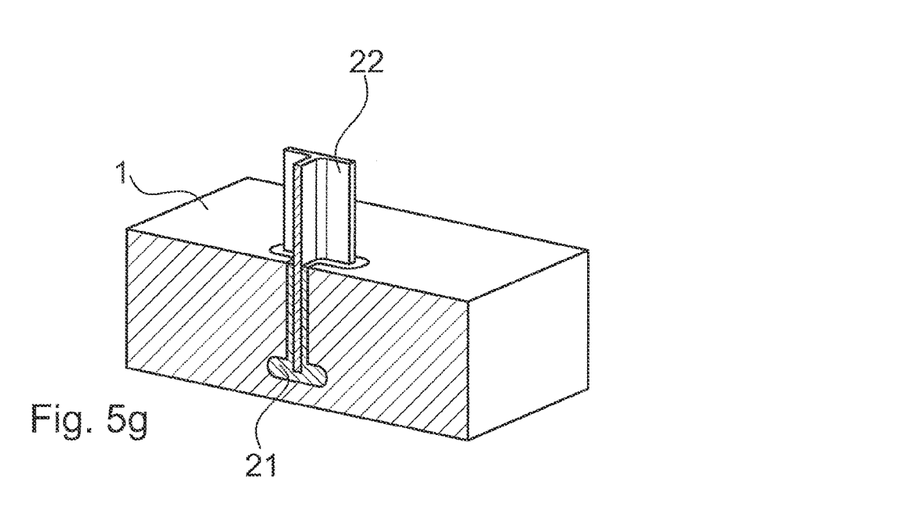

In the embodiment of FIGS. 5*a* and 5*b*, the core, compared to the embodiment of FIG. 2, has the shape of a double-T-bar, as representative for any non-circular cross section geometry. Such non-circular cross section geometries, and especially the double-T-bar geometry may bring about an optimized load distribution and a specific stiffness against bending. Thus, particularly, the double-T-bar shape has the advantage of being particularly mechanically stable. In accordance with the variant of FIG. 5*c* (showing a top view onto the upper surface) the shaft portion 1.1 of the opening—and consequently, after casting, the thermoplastic material—has an according shape so that the connection is secured against rotation also and the thermoplastic material has an approximately homogeneous thickness, which feature serves for evenly distributing the load when the connection is mechanically loaded. FIGS. 5*d*-5*h* show an other variant in which the opening has a double-T-cross section and the thermoplastic material has an approximately homogeneous thickness. Therein, FIG. 5*e* shows a section through plane A-A in FIG. 5*d*, whereas FIG. 5*f* depicts a section through plane B-B. In contrast to FIG. 5*c*, the distal broadening of the opening—and correspondingly the "foot" portion of the second part after casting—has a disc shape instead of a double-T-shape.

Referring to FIGS. 6*a*-7*c*, a first group of examples of a connection of a third part 31 with the first part by means of the second part is illustrated.

Figures 5H, 6A:
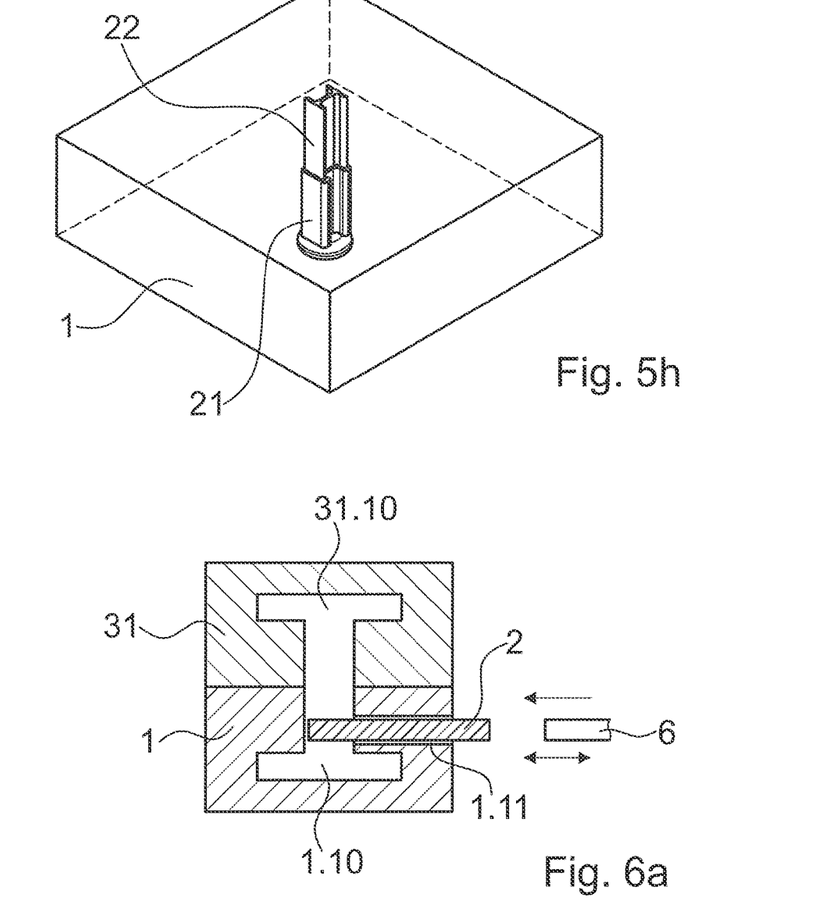

FIG. 6*a* shows a the first and second parts held together and aligned, so that a common cavity is present, defined by an opening portion 1.10 in the first part and an opening 31.10 in the third part. The opening in the first part further comprises an access portion 1.11 through which the second part 2 is introduced. The energy, for example, acts in the form of mechanical vibration energy coupled into the solid, not yet liquefied second part by a sonotrode 6. Alternatively, a laser light source of a lightguide may be used to couple radiation energy into the second part, with the interface between the distal end of the second part 2 and the first part being absorbing. As a still further alternative, the whole arrangement may be heatable. In both alternative embodiments, a piston element may be used to push the second part 2 deeper into the access portion while the second part is consumed by being molten at its distal end.

Figure 6B:
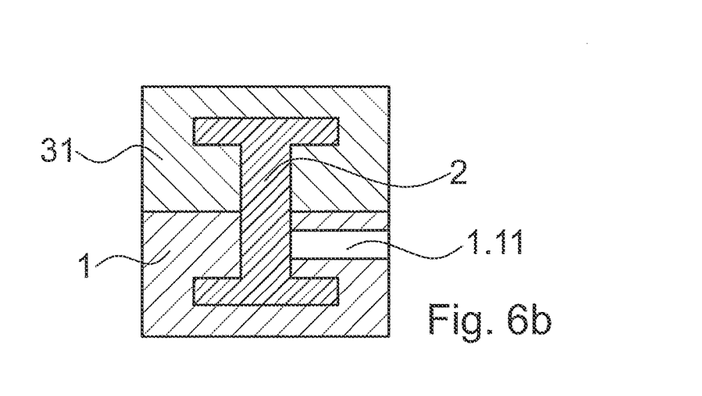

FIG. 6*b* shows the arrangement after the process. The thermoplastic material of the second part fills the common cavity. In the depicted configuration, the access portion 1.11 is empty after the process, but access portion 1.11 could also be filled at least partially.

Figure 7A:
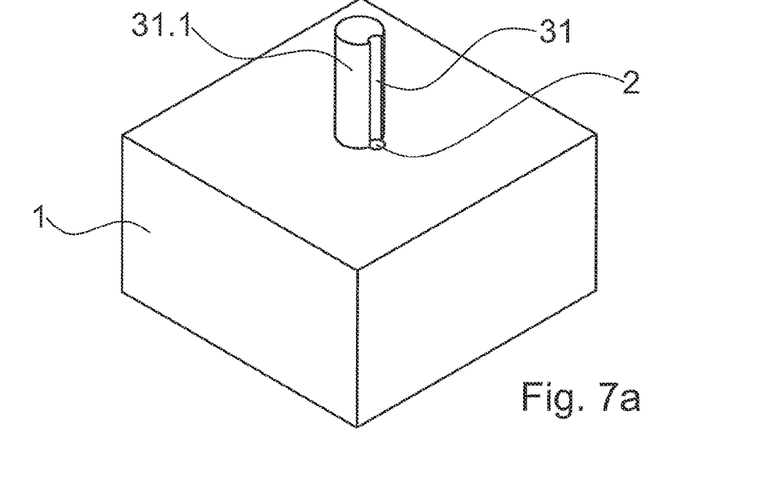
Figure 7B:
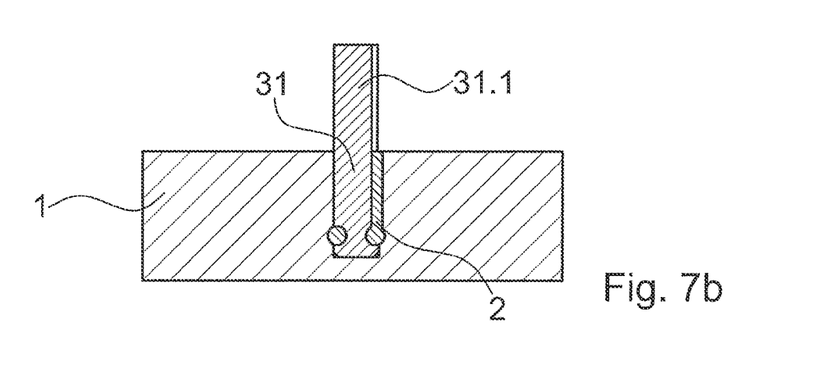
Figure 7C:
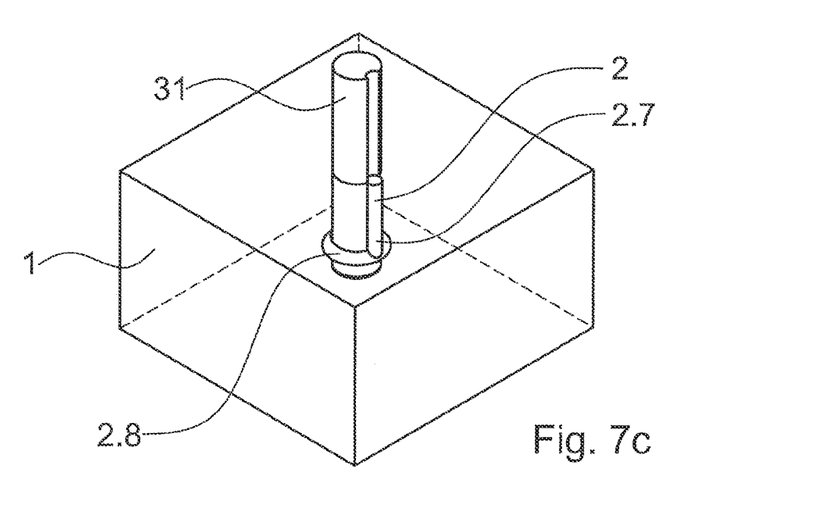

The embodiment of FIGS. 7*a*-7*c* is a further example for a connection of the first part 1 to a third part 31 in addition to the second part 2 and by means of the second part 2. In this embodiment, the volume is defined by the first part and the third part 31 together. The second part 2 consists of thermoplastic material.

For the process, firstly the third part and the third part are positioned relative to one another. Due to a lateral axial groove in the third part 31 and/or the first part 1, the volume includes a shaft portion. In addition, the volume includes a deep ring portion surrounding the third part. After the positioning of the first and third parts relative to one another, the second part is inserted and pressed into the opening and the volume by pressure acting from the proximal side while ultrasonic vibrations are coupled into it. The thermoplastic material of the second part 2 is liquefied and fills the volume by flowing, thereby forming a ring portion 2.8 and a shaft portion. As clearly visible in FIG. 7*b*, the ring portion secures the third part 31 to the first part 1 by a positive-fit connection.

Figure 8A:
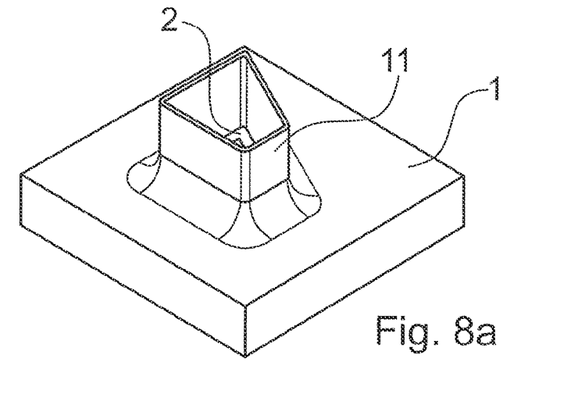
Figure 8B:
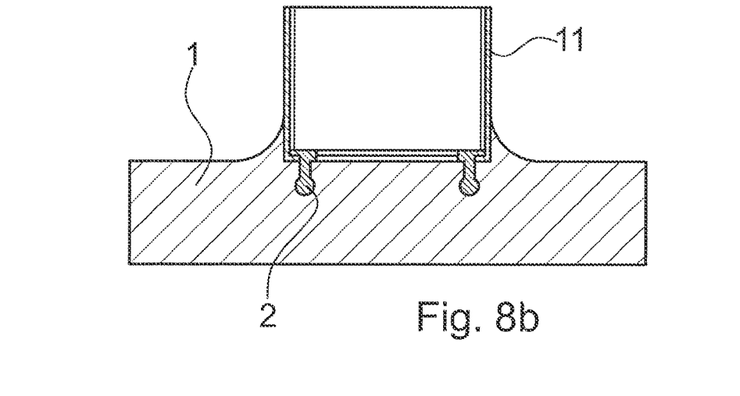
Figure 8C:
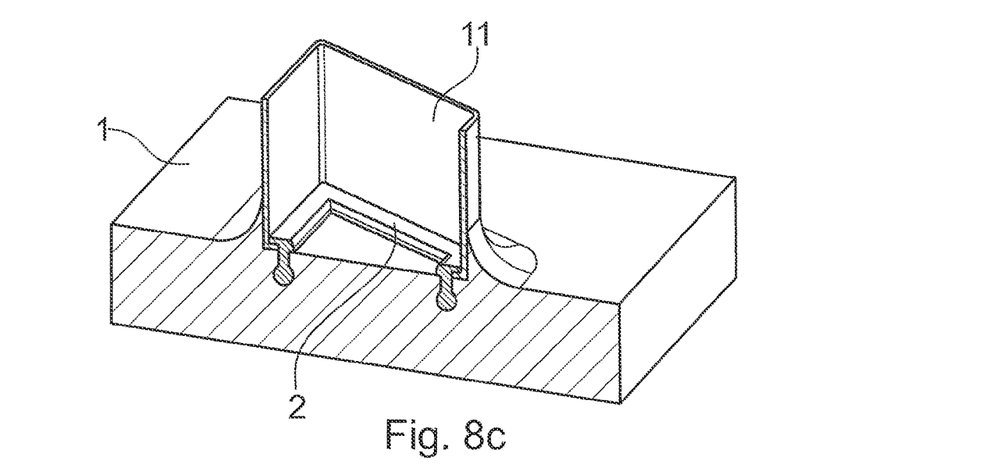

In the variant shown in FIGS. 8*a*-8*c*, the further element 11 secured to the first part 1 is a pipe, in the shown embodiment of not circular cross section. The second element 2 and the opening are ring-shaped and secure the further element by a positive-fit similarly to FIG. 1.

A same configuration as the one of FIGS. 8*a*-8*c* arises if the thermoplastic material belongs to the further element to be secured to the first part, i.e. in this case the further element 11 belongs to the second part and is a hard core 22 similar to, for example, FIG. 2.

Figure 9:
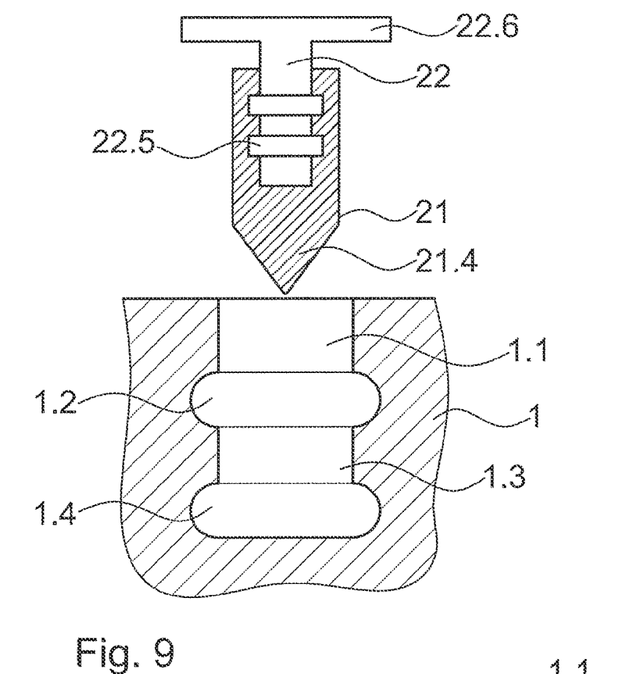

The variant of FIG. 9 has the following features that, for example in other embodiments, such as the ones described in the previous figures, can be implemented in combination or in sub-combinations or individually (i.e., these features do not necessitate each other).

The thermoplastic material 21 of the second part 2 has a distal tip 21.4 or other energy directing structure facilitating the onset of liquefaction at the distal end in contact with the ground of the opening;

The opening has a broadening 1.2 defining an undercut that is not at the distal ground of the opening;

The opening has more than one broadening 1.2, 1.4 (two broadenings);

The opening has two shaft portions 1.1, 1.3 that do not have an equal cross section.

The second part may have a correspondingly stepped shape (not shown in FIG. 9);

The second part has a stop feature 22.6 of a material that does not liquefy (for example of the core), as depicted defining the position at which the introduction into the opening should stop. The position of the stop feature 22.6 may be adapted to the volumes of the opening and of the portion of the second element distally of the stop feature so that the thermoplastic material fills the volume and is used up thereby;

As in previous embodiments, the core has broadening features 22.5 securing the core to the thermoplastic material in addition to adhesive forces.

Figure 10A:
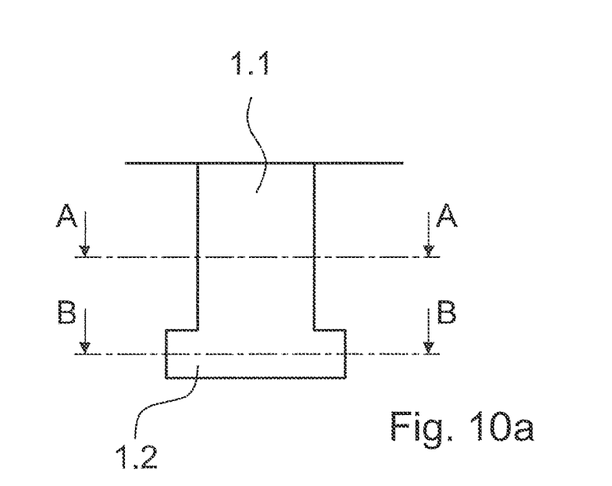
Figure 10B:
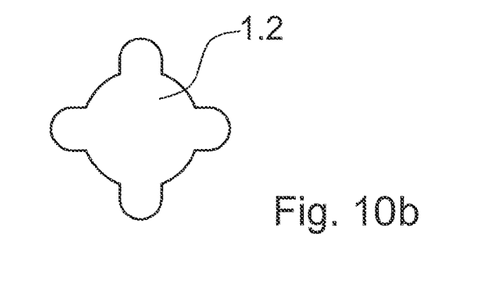

FIGS. 10*a* and 10*b* show a feature that is optional to all embodiments described in this text. The opening is shaped so that there the shape not only blocks a pulling out of the second element but also blocks further movement degrees of freedom. In the depicted embodiment, the opening to this end is not rotationally symmetric but at the region of the distal broadening (FIG. 10*b* shows a section along line B-B of FIG. 10*a*) has radial features, here in the form of four lobes protruding radially outwardly, whereas in the section of the shaft portion (section A-A, not shown in the figures), the cross section may be rotationally symmetric. Also combinations (asymmetric shapes in both section) or the alternative (only rotationally symmetric in the distal portion) are possible.

Figure 11A:
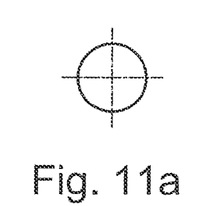
Figure 11B:
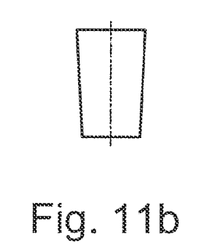
Figure 12A:
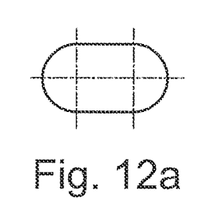
Figure 12B:
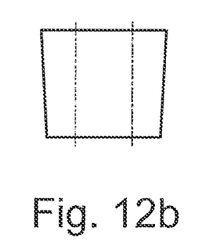
Figure 13A:
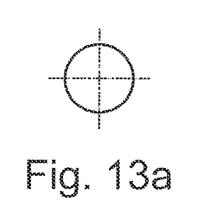
Figure 13B:
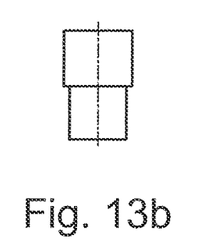
Figure 14A:
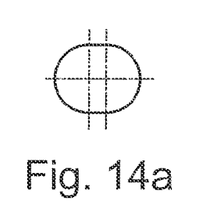
Figure 14B:
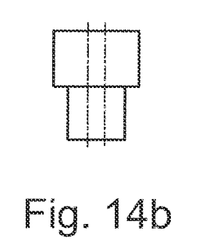
Figure 15A:
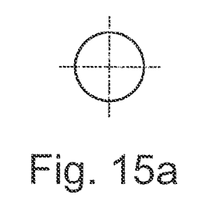
Figure 15B:
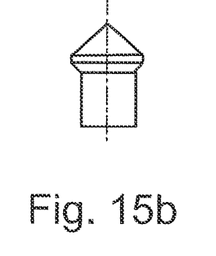
Figure 16A:
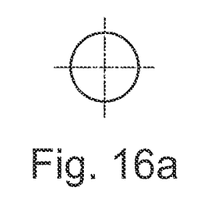
Figure 16B:
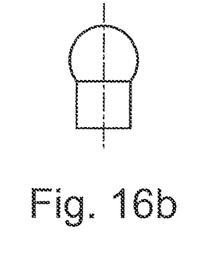
Figure 17A:
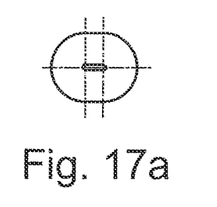
Figure 17B:
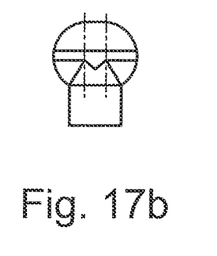
Figure 18A:
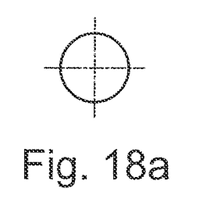
Figure 18B:
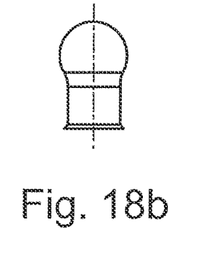

FIGS. 11*a* and 11*b*; 12*a* and 12*b*; 13*a* and 13*b*; 14*a* and 14*b*; 15*a* and 15*b*; 16*a* and 16*b*; 17*a* and 17*b*; 18*a* and 18*b*, show, in top view and side view, respectively, different possible shapes of openings that correspond to the cast shapes of the second part portions after the casting process. Note that in the respective b figures the orientation is upside-down compared to the orientations shown in the previous figures.

A second group of examples of a connection of a third part 31 with the first part 1 by means of the second part 2 is illustrated.

Figure 19A:
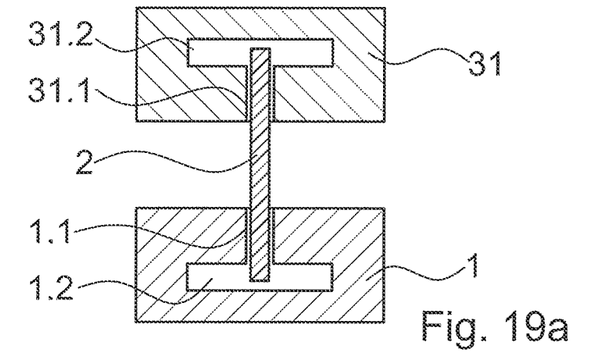
FIGS. 19, 20, and 21 other embodiments of a connection made by a method according to an embodiment of the invention.
Figure 19B:
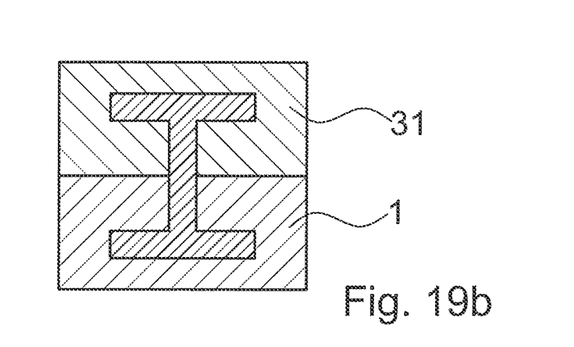

FIG. 19*a* shows the arrangement before energy is coupled into the second part 2. The second part projects both, into the opening 1.1, 1.2 of the first part 1, and into the opening 31.1, 31.2 (also having a shaft portion 31.1 and a broadening portion 31.2 forming an undercut) of the third part 31. Then, energy is coupled indirectly into the second part via the first part and/or the third part while the first and third parts are pressed against each other. For example, the first and third parts may be heated to this end. Alternatively, mechanical vibrations may be coupled into the first and/or third parts. FIG. 19b shows the arrangement after re-solidification of the thermoplastic material. The volume of the second part 2 corresponds to the volume of the common cavity.

Air that may still be present may escape via optional axial ridges, grooves or the like, that are positioned to be closed only in a final stage of the liquefaction so that a volume of any remaining of air is small. Also, compared to, for example, injection molding, the front velocity is substantially smaller, so that there is a substantially reduced risk of burnings or the like. Further, optionally small channels or the like for air to escape along the separation plane of the first and third parts may be present in case the volumes of remaining are would otherwise be too high.

Figure 20:
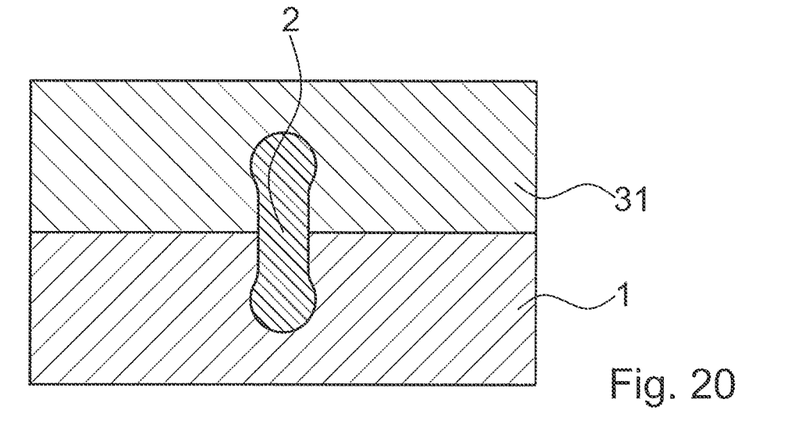

FIG. 20 yet shows another variant in which the second part 2 after the casting process is in an interior of an assembly formed by the first part 1 and a third part 31. For the process, the pressure and the vibrations are coupled into the first part, the third part or both. For example, the first and third parts may be compressed between two sonotrodes, with the second part being inserted into the aligned openings (here, the openings are symmetrical with respect to each other) in the respective parts.

Figures 21, 22A, 22B, 22C:
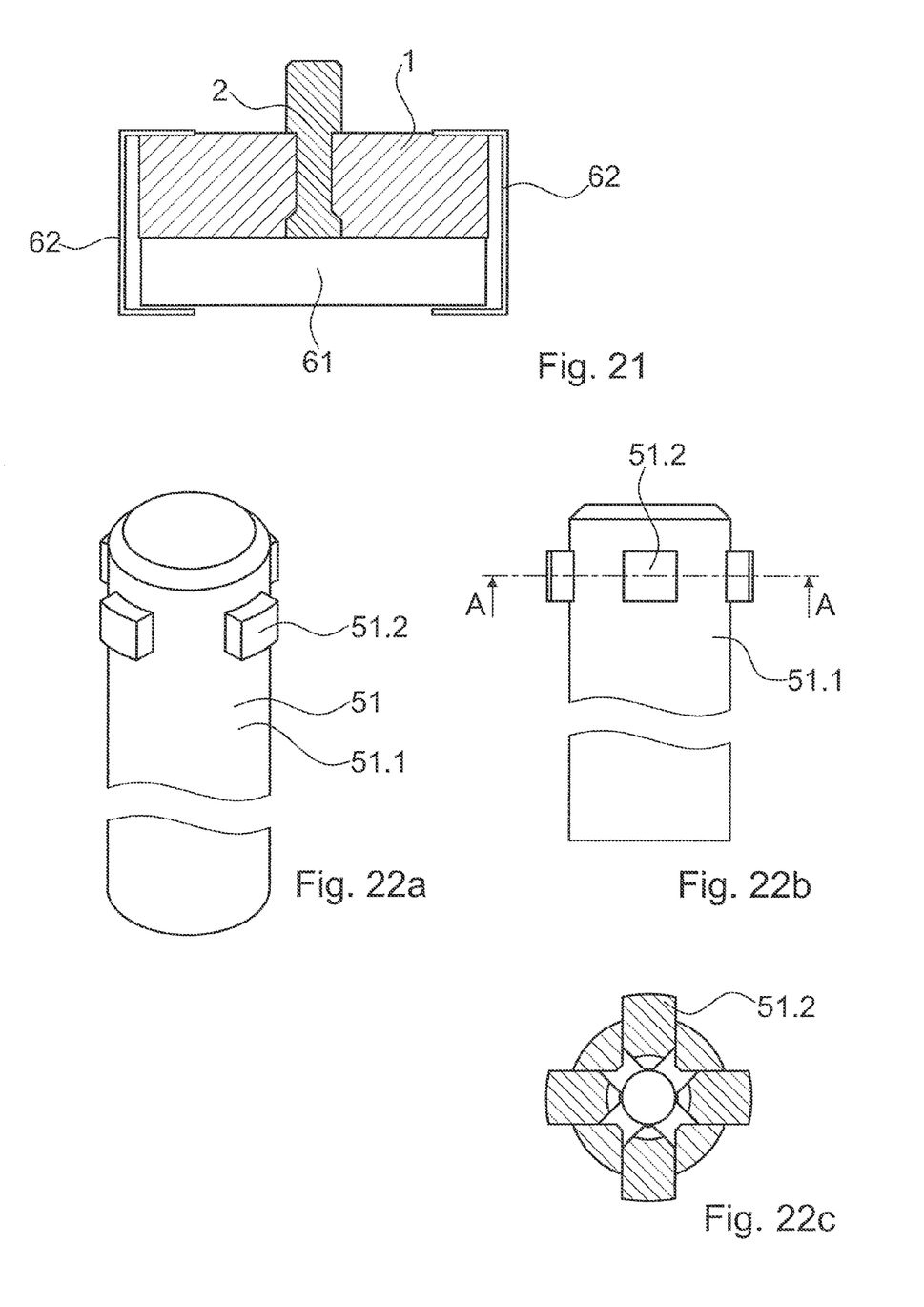
FIGS. 22*a*-22*c* a possible tool for use in a die cast process for manufacturing a first part.

FIG. 21 shows the first part with a through hole. In order to define the volume for the casting process, an auxiliary element 61 is provisionally tacked to the first part 1 for closing the volume off towards the distal side (securing clamps 62). For the cast process, the second part 2 is pressed, by the sonotrode, against the auxiliary element.

More in general, an auxiliary element may have any desired shape and act as shaping element to be removed after the process. Especially, the auxiliary element may be shaped to cast a functional shape.

FIGS. 22a, 22b, and 22c, finally, show a tool 51 that can be used for forming openings that define an undercut in a die cast process of a first part of the above-described kind. The tool has radially displaceable sliders 51.2 that can be pressed out of a cylindrical portion 51.1, for example by an auxiliary bolt inserted from the proximal side (i.e. lower side in FIG. 21). After the die cast process, the sliders 51.2 may retract and the tool 51 moved out of the cast form.

Various other embodiments may be envisaged without departing from the scope and spirit of the invention.

What is claimed is:

1. A method of connecting parts relative to one another is provided, the method comprising the steps of
    providing a first part, the first part defining an opening and a cavity communicating with said opening;
    providing a second part, the second part comprising thermoplastic material in a solid state;
    arranging the first part and the second part relative to one another so that the second part reaches into the opening, and wherein said cavity has an undercut and a well-defined cavity volume, said cavity volume being delimited by cavity walls surrounding the cavity;
    causing energy to act on the second part until at least a part of the thermoplastic material is caused to liquefy and fill the cavity; and
    causing the thermoplastic material to re-solidify, thereby anchoring the second part in the first part, wherein the cavity walls delimiting the cavity volume are impermeable to the liquefied thermoplastic material.

2. The method according to claim 1, wherein the energy is mechanical energy.

3. The method according to claim 2, wherein the mechanical energy is ultrasonic vibration energy.

4. The method according to claim 3, wherein the vibration energy is coupled into the second element from a sonotrode with a coupling-out face that is pressed against a coupling-in face of the second element.

5. The method according to claim 1, comprising the further step of providing a third part to be assembled with the first part, wherein the energy is coupled into the second element via the first part or the third part, and wherein after the step of causing the thermoplastic material to re-solidify, the thermoplastic material at least partially fills the cavity being a common cavity of the first part and the third part.

6. The method according to claim 5, wherein the common cavity is a closed cavity.

7. The method according to claim 6, wherein a volume of the second part is chosen to correspond to a volume of the cavity.

8. The method according to claim 1, wherein during the step of causing energy to act on the second part, mechanical pressure is caused to act on the second part.

9. The method according to claim 8, wherein the pressure is maintained for some time after the energy has stopped acting.

10. The method according to claim 1, wherein the second part is structured to be capable of connecting a further part to the first part.

11. The method according to claim 1, wherein the second part has a core of a core material or material combination different from the thermoplastic material, which core material/material combination remains solid during the step of causing the thermoplastic material to liquefy.

12. The method according to claim 1, wherein the first part is a die cast object.

13. The method according to claim 1, wherein the opening is open towards a proximal side, wherein the second element is inserted from the proximal side, and wherein during the step of causing energy to act on the second part, the second part is pressed towards the distal side.

14. The method according to claim 13, wherein during the step of pressing, the second part is pressed against a ground of the opening or against an auxiliary element distally of the first part and provisionally secured to the first part.

15. The method according to claim 13, wherein the second part has a proximal head or flange portion that rests, after the step of causing the thermoplastic material to re-solidify, against a rim of an opening of a further part to be mounted to the first part or a rim of the opening.

16. The method according to claim 13, wherein after the step of causing the thermoplastic material to re-solidify, the second part completely fills the opening.

17. The method according to claim 1, wherein the thermoplastic material is a fiber reinforced polymer.

18. The method according to claim 17, wherein a volume fraction of fibers reinforcing the polymer is between 15% and 60%.

* * * * *